United States Patent
Lahr et al.

(10) Patent No.: US 10,017,044 B2
(45) Date of Patent: Jul. 10, 2018

(54) HYBRID POWERTRAIN SYSTEM

(71) Applicant: GM GLOBAL TECHNOLOGY OPERATIONS LLC, Detroit, MI (US)

(72) Inventors: Derek F. Lahr, Howell, MI (US); Farzad Samie, Franklin, MI (US); Norman K. Bucknor, Troy, MI (US); Chunhao J. Lee, Troy, MI (US); Dongxu Li, Troy, MI (US); Chandra S. Namuduri, Troy, MI (US); Alexandru Rajala, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/590,462

(22) Filed: May 9, 2017

(65) Prior Publication Data
US 2017/0326965 A1    Nov. 16, 2017

Related U.S. Application Data

(60) Provisional application No. 62/336,986, filed on May 16, 2016.

(51) Int. Cl.
*B60K 6/50*   (2007.10)
*B60K 6/40*   (2007.10)
*B60K 6/20*   (2007.10)
*B60K 6/54*   (2007.10)
*B60K 6/547*   (2007.10)

(52) U.S. Cl.
CPC .................. *B60K 6/50* (2013.01); *B60K 6/40* (2013.01); *B60K 6/20* (2013.01); *B60K 6/54* (2013.01); *B60K 6/547* (2013.01)

(58) Field of Classification Search
CPC ... B60K 6/20; B60K 6/22; B60K 6/38; B60K 6/387; B60K 6/40; B60K 6/42; B60K 6/48; B60K 6/50; B60K 6/54; B60K 6/547
See application file for complete search history.

(56) References Cited

U.S. PATENT DOCUMENTS

| | | | | |
|---|---|---|---|---|
| 5,890,468 | A * | 4/1999 | Ozawa | F02B 37/005 123/561 |
| 6,283,239 | B1 * | 9/2001 | Tsukamoto | B60K 6/48 180/65.25 |
| 9,458,928 | B2 * | 10/2016 | Kawakami | F16H 61/0028 |
| 9,676,267 | B2 * | 6/2017 | Hirose | B60K 6/48 |
| 2007/0021259 | A1 * | 1/2007 | Tenberge | B60K 6/445 475/5 |
| 2007/0273204 | A1 * | 11/2007 | Kodama | B60K 6/48 303/146 |

(Continued)

*Primary Examiner* — Erez Gurari
(74) *Attorney, Agent, or Firm* — Quinn IP Law

(57) ABSTRACT

A powertrain system is described, and includes an internal combustion engine including a crankshaft and an electric machine including a rotatable shaft, wherein the rotatable shaft is coupled to a motor pulley. A torque converter includes an impeller and a pump, wherein the pump is coupled to an outer sheave. An off-axis mechanical drive system includes the outer sheave of the torque converter rotatably coupled to the motor pulley of the electric machine. The electric machine is coupled to the pump of the torque converter via the off-axis mechanical drive system, and the crankshaft is coupled to the pump of the torque converter via a clutch.

18 Claims, 3 Drawing Sheets

(56) References Cited

U.S. PATENT DOCUMENTS

| | | | |
|---|---|---|---|
| 2009/0314559 A1* | 12/2009 | Palitto | B60K 5/08 |
| | | | 180/65.22 |
| 2010/0144487 A1* | 6/2010 | Noboru | F02N 15/08 |
| | | | 477/39 |
| 2012/0073281 A1* | 3/2012 | Hirose | B60K 6/48 |
| | | | 60/439 |
| 2012/0234135 A1* | 9/2012 | Oki | B60K 6/383 |
| | | | 74/665 A |
| 2012/0290158 A1* | 11/2012 | Yoshikawa | B60K 6/48 |
| | | | 701/22 |
| 2013/0304293 A1* | 11/2013 | Yoshikawa | B60K 6/48 |
| | | | 701/22 |
| 2016/0161000 A1* | 6/2016 | Miyaoka | F16H 61/0021 |
| | | | 477/37 |
| 2017/0066437 A1* | 3/2017 | Yamamoto | B60K 6/48 |
| 2017/0144531 A1* | 5/2017 | Yanagida | B60K 6/48 |

* cited by examiner

HYBRID POWERTRAIN SYSTEM

CROSS-REFERENCE TO RELATED APPLICATIONS

This application claims the benefit of U.S. Provisional Patent Application No. 62/336,986, filed on May 16, 2016, the disclosure of which is hereby incorporated by reference.

BACKGROUND

Known hybrid powertrain systems include internal combustion engines and electric motor/generators that are coupled to transmissions to transfer torque to a driveline for tractive effort. Known electric motor/generators are supplied electric power from energy storage systems. Powertrain systems may operate in various modes to generate and transfer propulsion power to vehicle wheels.

SUMMARY

A powertrain system is described, and includes an internal combustion engine including a crankshaft and an electric machine including a rotatable shaft, wherein the rotatable shaft is coupled to a motor pulley. A torque converter includes an impeller and a pump, wherein the pump is coupled to an outer sheave. An off-axis mechanical drive system includes the outer sheave of the torque converter rotatably coupled to the motor pulley of the electric machine. The electric machine is coupled to the pump of the torque converter via the off-axis mechanical drive system, and the crankshaft is coupled to the pump of the torque converter via a clutch.

An aspect of the disclosure includes the clutch being a selectable one-way clutch.

Another aspect of the disclosure includes a starter rotatably coupled to the crankshaft.

Another aspect of the disclosure includes the electric machine being electrically connected to an inverter that is electrically connected to an electric power source, wherein the electric power source is configured to operate at a voltage level that is less than 60 V DC.

Another aspect of the disclosure includes the outer sheave of the torque converter being rotatably coupled to the motor pulley of the electric machine via a continuous belt.

Another aspect of the disclosure includes the outer sheave of the torque converter being rotatably coupled to the motor pulley of the electric machine via a chain.

Another aspect of the disclosure includes the outer sheave of the torque converter being rotatably coupled to the motor pulley of the electric machine via meshed gears.

Another aspect of the disclosure includes a transmission including an input member and an output member, and a driveline, wherein the input member of the transmission is coupled to the impeller of the torque converter and the output member of the transmission is coupled to the driveline.

Another aspect of the disclosure includes a controller operatively connected to the powertrain system, wherein the controller includes an instruction set that is executable to autostop the internal combustion engine and control operation of the powertrain system in an electric-only drive mode to transfer propulsion power to the driveline.

Another aspect of the disclosure includes a controller operatively connected to the powertrain system, wherein the controller includes an instruction set that is executable to control operation of the powertrain system in an engine/electric-assist drive mode to transfer propulsion power to the driveline.

Another aspect of the disclosure includes a controller operatively connected to the powertrain system, wherein the controller includes an instruction set that is executable to control operation of the powertrain system in a regenerative mode to transfer propulsion power to the driveline.

Another aspect of the disclosure includes a controller operatively connected to the powertrain system, wherein the controller includes an instruction set that is executable to control operation of the powertrain system in an engine-only drive mode to transfer propulsion power to the driveline.

Another aspect of the disclosure includes the internal combustion engine, transmission and driveline being disposed in a front-wheel drive configuration of a vehicle.

Another aspect of the disclosure includes the internal combustion engine, transmission and driveline being disposed in a rear-wheel drive configuration of a vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is known in the related art has not been described in detail in order to avoid unnecessarily obscuring the disclosure.

Figure 1:
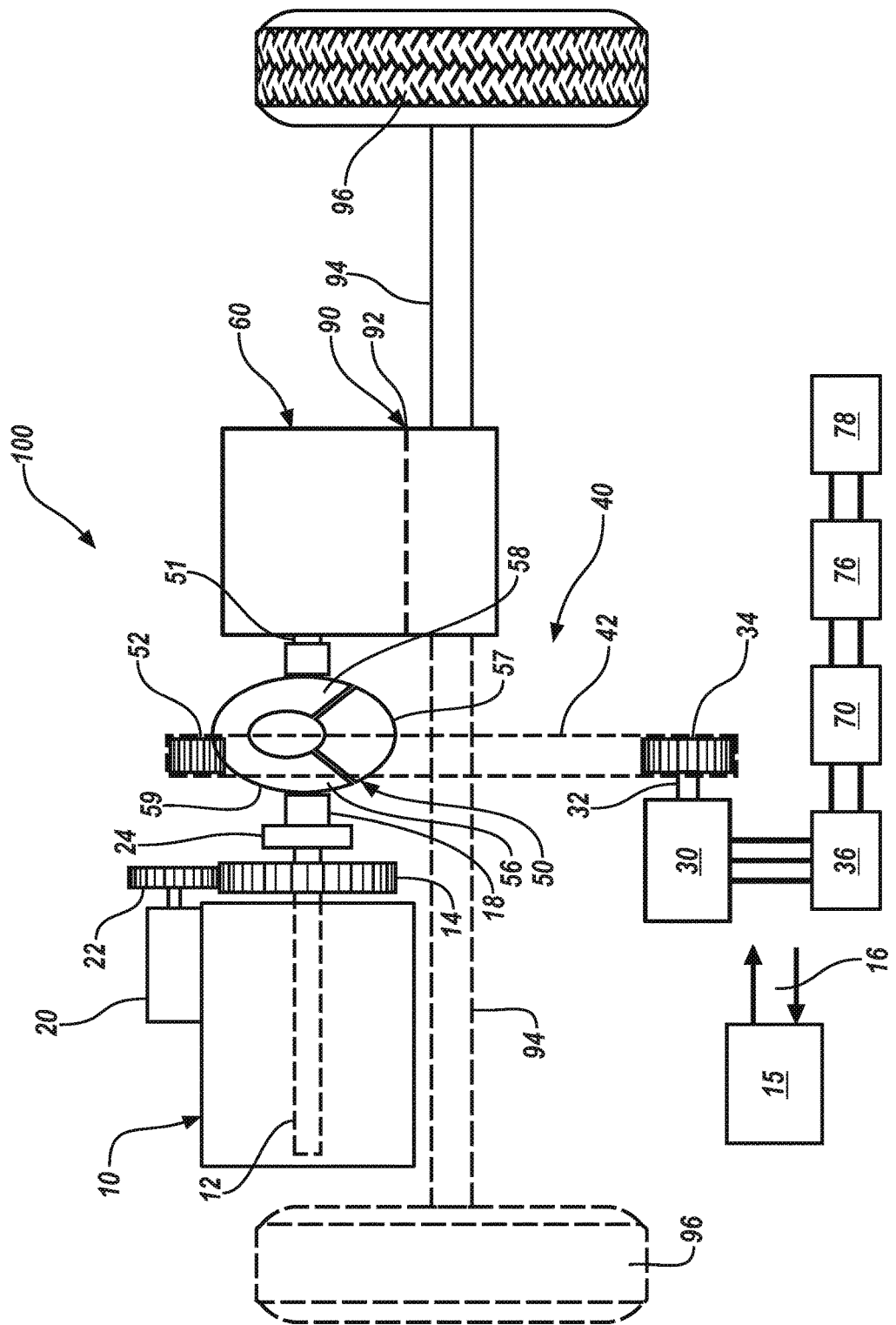
FIG. 1 schematically illustrates a powertrain system that includes an internal combustion engine having a crankshaft that is coupled to a transmission via a torque converter and is coupled to an electrically-powered torque machine via an off-axis mechanical drive system, wherein the transmission couples to a driveline, in accordance with the disclosure.

Referring now to the drawings, wherein the showings are for the purpose of illustrating certain exemplary embodiments only and not for the purpose of limiting the same, FIG. 1 schematically shows an embodiment of a hybrid powertrain system 100 including multiple torque-generating devices including an internal combustion engine (engine) 10 and at least one electrically-powered torque machine (electric machine) 30. The engine 10 and electric machine 30 are mechanically coupled via a torque converter 50 and an off-axis mechanical drive system 40 to transfer propulsion power via a transmission 60 and a driveline 90 to vehicle wheels 96. The concepts described herein may apply to any suitable powertrain configuration that includes the internal combustion engine 10 and the electric machine 30 coupled via the torque converter 50 and the off-axis mechanical drive system 40. Like numerals refer to like elements throughout the description. Operation of the powertrain system 100 may be controlled by a controller 15, which is shown as a unitary device for ease of illustration. The powertrain system 100 may be advantageously employed on a vehicle to provide propulsion power, and the vehicle may include, by way of non-limiting examples, a passenger vehicle, a light-duty or heavy-duty truck, a utility vehicle, an agricultural vehicle, an industrial/warehouse vehicle, or a recreational off-road vehicle.

The powertrain system 100 is configured so that the engine 10 and the electric machine 30 mechanically couple to the transmission 60 employing the torque converter 50 and the off-axis mechanical drive system 40. This enables the powertrain system 100 to be configured in a front-wheel drive arrangement and operate in one of multiple selectable modes, including an engine-only drive mode, an electric-only drive mode, a regenerative braking mode, and an engine/electric-assist mode. Alternatively, the powertrain system 100 can be configured in a rear-wheel drive arrangement or an all-wheel drive arrangement and be operable in one of multiple selectable modes, including an engine-only drive mode, an electric-only drive mode, a regenerative braking mode, and an engine/electric-assist mode. The configuration of the powertrain system 100 enables engine stop/start operations during powertrain system operation. The powertrain system 100 described herein advantageously employs the torque converter 50, which results in improved drivability during acceleration events, transmission shifting events and deceleration events. Furthermore, the off-axis mechanical drive system 40 is preferably configured to spin the electric machine 30 at the engine speed, thereby eliminating need for an alternator to effect charging of a low-voltage battery 78. Furthermore, there is no need for an auxiliary electrically-powered hydraulic pump for the transmission 60 since the electric machine 30 is configured to and can be controlled to spin the torque converter 50 when the engine 10 is in an OFF state. Furthermore, an engine disconnect clutch 24 may be integrated into the housing of the torque converter 50, thus facilitating regenerative braking mode and coasting operations, which facilitates operation in the electric-only drive mode, and enhancing off-throttle sailing.

The engine 10 is preferably configured as a multi-cylinder internal combustion engine that converts fuel to mechanical torque through a thermodynamic combustion process. The engine 10 is equipped with a plurality of actuators and sensing devices for monitoring operation and delivering fuel to form in-cylinder combustion charges that generate an expansion force onto pistons, with such force transferred to a crankshaft 12 to produce torque. The engine 10 includes a starter 20 that includes a starter switch and a starter gear 22, wherein the starter gear 22 meshingly engages gear teeth that are disposed on an outer circumference of a flywheel 14 that is coupled to the crankshaft 12. The starter 20 is preferably configured as a single-phase electric motor including an output shaft that couples to the starter gear 22, wherein the single-phase electric motor is electrically connected to the low-voltage battery 78 via activation of the starter switch. In one embodiment, the starter gear 22 is permanently meshingly engaged with the flywheel 14. The flywheel 14 also couples to an input member 18 that is coupled via an engine disconnect clutch 24 to a pump portion 56 of the torque converter 50. In one embodiment, the engine disconnect clutch 24 is a selectable one-way clutch. The actuators of the engine 10, including the starter switch are preferably controlled by an engine controller.

The engine 10 is preferably mechanized with suitable hardware and the engine controller preferably includes suitable control routines to execute autostart and autostop functions, fueled and fuel cutoff (FCO) functions, and all-cylinder and cylinder deactivation functions during ongoing operation of the powertrain 100. The engine 10 is considered to be in an OFF state when it is not rotating. The engine 10 is considered to be in an ON state when it is rotating. The all-cylinder state includes engine operation wherein all of the engine cylinders are activated by being fueled and fired. The cylinder deactivation state includes engine operation wherein one or a plurality of the engine cylinders are deactivated by being unfueled and unfired, and preferably operating with engine exhaust valves in open states to minimize pumping losses, while the remaining cylinders are fueled and fired and thus producing torque. The ON state may include the FCO state in which the engine 10 is spinning and unfueled. The ON state may include the cylinder deactivation state. The ON state may include the FCO state in combination with the cylinder deactivation state. Engine mechanizations and control routines for executing autostart, autostop, FCO and cylinder deactivation control routines are known and not described herein. Engine operation may be described in context of engine states, including an engine operation state, an engine fueling state and an engine cylinder state. The engine operation states preferably include the ON and the OFF state. The engine fueling states include the fueled state and the FCO state. The engine cylinder states include the all-cylinder state and the cylinder deactivation state.

The electric machine 30 is preferably a multi-phase electric motor/generator configured to convert stored electric energy to mechanical power and convert mechanical power to electric energy that may be stored in a DC power source (48V battery) 70. The 48V battery 70 is preferably configured at a nominal 48 Vdc voltage level. The electric machine 30 preferably includes a rotor and a stator, and electrically connects via the inverter module 36 to the 48V battery 70. The rotor couples to a rotatable member 32 that couples to a motor pulley 34 that is an element of the off-axis mechanical drive system 40. Alternatively, another non-combustion torque machine, such as a pneumatically-powered device or a hydraulically-powered device may be employed in place of the electric machine 30. By way of definition, a non-combustion torque machine is any device capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are known and not described in detail herein.

Figure 2:
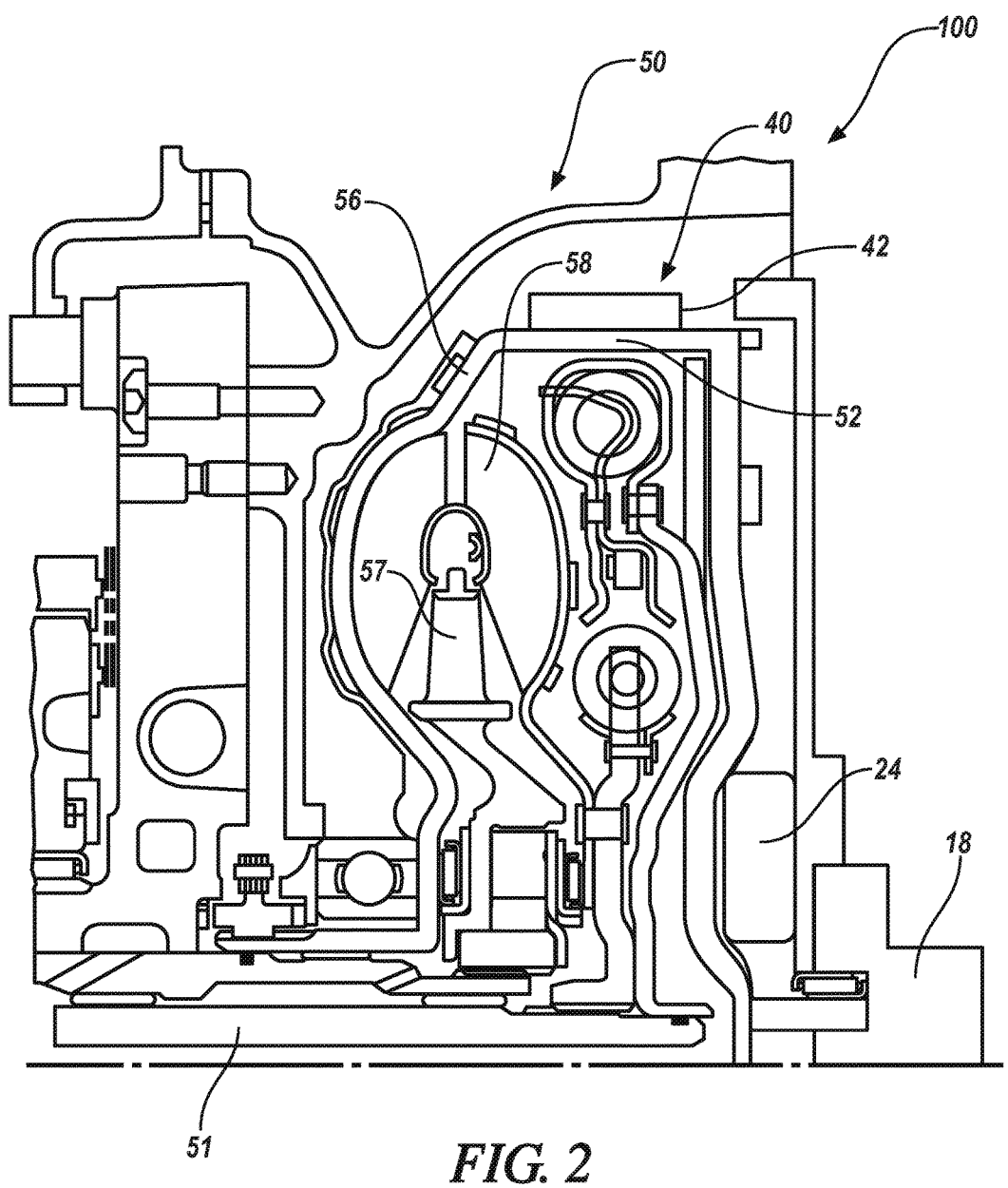
FIG. 2 schematically illustrates a partial cut-away side-view of a portion of a powertrain system that includes a torque converter and an off-axis mechanical drive system that is coupled to an electrically-powered torque machine, in accordance with the disclosure.

The torque converter 50 is a rotatable torque coupling device arranged between the input member 18 of the engine 10 and an input member 51 of the transmission 60. The torque converter 50 preferably includes a pump 56 rotatably coupled to the crankshaft 12, a stator 57, an impeller 58 rotatably coupled to the input member 51 to the transmission 60, and a controllable clutch 59. The torque converter 50 operates to provide fluid torque coupling between the pump 56 and the impeller 58 when the clutch 59 is deactivated or released, and provides mechanical torque coupling between the pump 56 and the impeller 58 when the clutch 59 is activated. Other details related to design of torque converters and torque converter clutches is known and not described in detail herein. The pump 56 is coupled to an outer sheave 52, which may be disposed on an outer circumference of the pump 56. One exemplary embodiment of a portion of the powertrain system 100, including the torque converter 50 and the outer sheave 52, is shown with reference to FIG. 2. Alternatively, the outer sheave 52 may be arranged on a separate pulley that is fixedly attached to the pump 56 to rotate therewith, with an outer circumference that is substantially equal an outer circumference of the pump 56 and is co-axial therewith.

The off-axis mechanical drive system 40 preferably includes, in one embodiment, the outer sheave 52 coupled to the pump 56 of the torque converter 50, the motor pulley 34 coupled to the rotor of the electric machine 30, and a continuous belt 42. The outer sheave 52 and the motor pulley 34 are rotatably coupled via the continuous belt 42 to transfer torque therebetween. The outer sheave 52 and the motor pulley 34 may be suitably configured with belt contact surfaces that are in the form of a single circumferential groove, multiple circumferential grooves, radial teeth, or another suitable arrangement, and the continuous belt 42 is configured in accordance with the belt contact surfaces of the outer sheave 52 and the motor pulley 34. Preferably, the off-axis mechanical drive system 40 includes a belt tensioner to ensure that the continuous belt 42 makes contact with at least 180° of the belt contact surfaces of the outer sheave 52 and the motor pulley 34. The continuous belt 42 may be fabricated from Kevlar cords in one embodiment. In one embodiment, the pulley ratio between the outer sheave 52 and the motor pulley 34 is 2.5:1. Alternatively, the outer sheave 52 and the motor pulley 34 are rotatably coupled via a continuous chain to transfer torque therebetween. Alternatively, the outer sheave 52 and the motor pulley 34 are rotatably coupled via meshed gears to transfer torque therebetween.

The transmission 60 may be arranged in a step-gear configuration in one embodiment, and may include one or more differential gear sets and activatable clutches configured to effect torque transfer in one of a plurality of fixed gear states over a range of speed ratios between the engine 10, the input member 51 and the output member 62. The transmission 60 may include a first rotational speed sensor in the form of a Hall-effect sensor or another suitable sensor that may be configured to monitor rotational speed of the input member 51 and/or a second rotational speed sensor that may be configured to monitor rotational speed of the output member 62. The transmission 60 includes any suitable configuration, and may be an automatic transmission that automatically shifts between the fixed gear states to operate at a gear ratio that achieves a preferred match between an output torque request and an engine operating point. The transmission 60 automatically executes upshifts to shift to a gear state having a lower numerical multiplication ratio (gear ratio) at preset speed/load points and executes downshifts to shift to a gear state having a higher numerical multiplication ratio at preset speed/load points. The transmission 60 may be controlled using a controllable hydraulic circuit that communicates with a transmission controller, which may be integrated into or separate from the controller 15. The transmission controller preferably controls the torque converter clutch 59. The transmission 60 executes upshifts to shift to a fixed gear that has a lower numerical multiplication ratio (gear ratio) and executes downshifts to shift to a fixed gear that has a higher numerical multiplication ratio. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state. Designs of transmissions and transmission shifting are known and not described in detail herein. Transmission operation may be described in context of a control variable that may be communicated to the transmission 60 that is related to a selected fixed gear state.

The driveline 90 may include a differential gear device 92 that mechanically couples to axle(s) 94 that mechanically couples to wheel(s) 96 in one embodiment. The driveline 90 transfers tractive power between an output member of the transmission 60 and a road surface via the wheel(s) 96. The powertrain 100 is illustrative, and the concepts described herein apply to other powertrain systems that are similarly configured.

The inverter module 36 is configured with suitable control circuits including power transistors, e.g., integrated gate bipolar transistors (IGBTs) for transforming DC electric power to AC electric power and transforming AC electric power to DC electric power. The inverter module 36 preferably employs pulsewidth-modulating (PWM) control of the IGBTs to convert stored DC electric power originating in the 48V battery 70 to AC electric power to drive the electric machine 30 to generate torque. Similarly, the inverter module 36 converts mechanical power transferred to the electric machine 30 to DC electric power to generate electric energy that is storable in the 48V battery 70, including as part of a regenerative braking control strategy. The inverter module 36 receives motor control commands from the controller 15 and controls inverter states to provide a desired motor drive operation or a regenerative braking operation. In one embodiment, an auxiliary DC/DC electric power converter 76 electrically connects to the bus and provides electric power to charge the low-voltage battery 78 via a low-voltage bus. Such electric power connections are known and not described in detail. The low-voltage battery 78 provides low-voltage electric power to low-voltage systems on the powertrain system 100 and the vehicle, including, e.g., the starter 20, electric windows, HVAC fans, seats, and other devices. In one embodiment the low-voltage battery 78 is configured to operate at a nominal 12 Vdc voltage level.

The 48V battery 70 is preferably disposed to supply electric power at a nominal voltage level of 48 Vdc, and may be any DC power source, e.g., a multi-cell lithium ion device, an ultra-capacitor, or another suitable device without limitation. Monitored parameters related to the 48V battery 70 preferably include a state of charge (SOC), temperature, and others. In one embodiment, the 48V battery 70 may electrically connect via an on-vehicle battery charger to a remote, off-vehicle electric power source for charging while the vehicle is stationary.

The controller 15 may signally connect to an operator interface (not shown) and provides hierarchical control of a plurality of control devices to effect operational control of individual elements of the powertrain 100, including, e.g., the inverter module 36, the engine controller and the transmission controller. The controller 15 communicates with each of the inverter module 36, the engine controller and the transmission controller, either directly or via a communications bus 16 to monitor operation and control operations thereof.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

Vehicle operation responsive to operator requests includes operating modes of acceleration, braking, steady-state running, coasting, and idling. The acceleration mode includes an operator request to increase vehicle speed. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold speed and the operator request to the accelerator pedal is at a point that is less than required to maintain the present vehicle speed. The idle mode includes vehicle operation wherein vehicle speed is at or near zero.

The powertrain system 100 is operative in one of a plurality of modes, which may be selected and implemented during ongoing powertrain operation to effect vehicle operations of acceleration, braking, steady-state running, coasting, and idling. The powertrain modes include the engine-only drive mode, an electric-only drive mode, a regenerative mode, and an engine/electric-assist drive mode, with accompanying engine autostart/autostop operations. In the engine-only drive mode, the engine 10 is controlled to generate propulsion power while the electric machine 30 freewheels. This mode may be commanded during vehicle acceleration or steady-state running. In the electric-only drive mode, the electric machine 30 is controlled as a motor to generate propulsion power, while the engine 10 in in the OFF state and disconnected by action of the engine disconnect clutch 24. This mode may be commanded during idle, vehicle acceleration or steady-state running. In the regenerative mode, the electric machine 30 is controlled as a generator to react driveline torque and generate electric power, while the engine 10 either at idle or in in the OFF state and disconnected by action of the engine disconnect clutch 24. This mode may be commanded during coasting and vehicle braking. In the engine/electric-assist drive mode, the engine 10 and the electric machine 30 are controlled to generate propulsion power. This mode may be commanded during vehicle acceleration or steady-state running.

Figure 3:
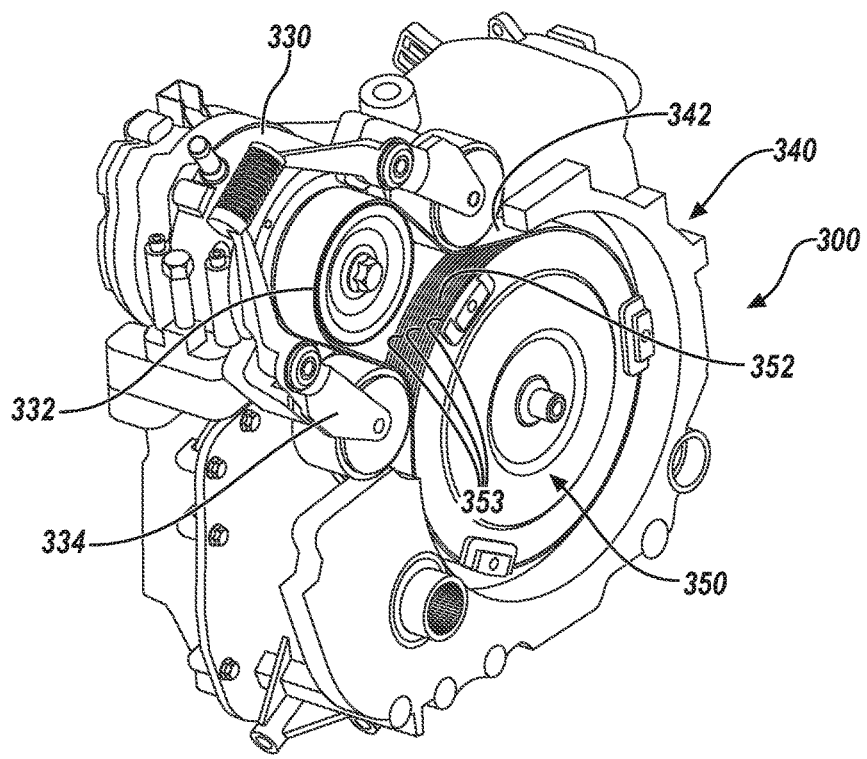
FIG. 3 schematically illustrates an isometric view of portion of an embodiment an off-axis mechanical drive system that is coupled to an electrically-powered torque machine that is part of a powertrain system, in accordance with the disclosure.

FIG. 3 schematically illustrates an isometric view of portion of an embodiment the off-axis mechanical drive system 340 that is coupled to an electrically-powered torque machine (electric machine) 330 via a torque converter 350 that is coupled to an output member of an internal combustion engine (not shown) that is part of an embodiment of a hybrid powertrain system 300 that includes multiple torque-generating devices. The hybrid powertrain system 300 further includes a transmission and a driveline (not shown) to transfer propulsion power to vehicle wheels (not shown) in response to operator inputs. The concepts described herein may apply to any suitable front-wheel drive, rear-wheel drive or all-wheel drive powertrain configuration, with operation controlled by a controller. In this embodiment, the off-axis mechanical drive system 340 is preferably configured as a belt drive, including an outer sheave 352 that is annular to and coupled to a pump 356 of the torque converter 350. Other elements of the off-axis mechanical drive system 340 include a motor pulley 332 that is coupled to a rotor of the electric machine 330, a continuous belt 342, and a belt tensioner 334. The belt tensioner 334 is disposed to urge the continuous belt 342 to ensure that the continuous belt 342 makes contact with at least 180° of the belt contact surfaces of the outer sheave 352 and the motor pulley 332, thus minimizing or totally eliminating belt slippage. In one embodiment, and as shown the belt tensioner 334 is a two-sided belt tensioner. Alternatively, the belt tensioner may be configured as a single-sided device. The outer sheave 352 and the motor pulley 332 are rotatably coupled via the continuous belt 342 to transfer torque therebetween. The outer sheave 352 and the motor pulley 334 may be suitably configured with belt contact surfaces, and are arranged to have multiple circumferential grooves in their respective annular surfaces. Some of the circumferential grooves in the annular surface of the outer sheave 352 are indicated by numeral 353. The continuous belt 342 is preferably configured in accordance with the circumferential grooves in the annular surface of the outer sheave 352 and the motor pulley 334, and thus has a plurality of internal-facing circumferential grooves. The continuous belt 342 may be fabricated from Kevlar cords in one embodiment. In one embodiment, the pulley ratio between the outer sheave 352 and the motor pulley 334 is 2.5:1.

Figure 4:
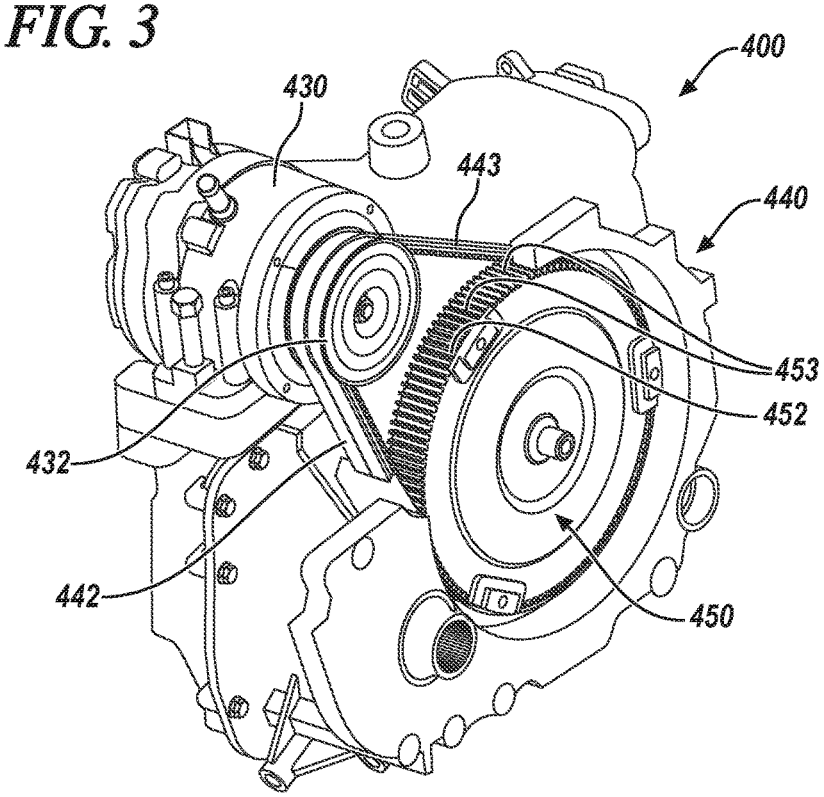
FIG. 4 schematically illustrates an isometric view of portion of another embodiment an off-axis mechanical drive system that is coupled to an electrically-powered torque machine that is part of a powertrain system, in accordance with the disclosure.

FIG. 4 schematically illustrates an isometric view of portion of another embodiment the off-axis mechanical drive system 440 that is coupled to an electrically-powered torque machine (electric machine) 430 via a torque converter 450 that is coupled to an output member of an internal combustion engine (not shown) that is part of an embodiment of a hybrid powertrain system 400 that includes multiple torque-generating devices. The hybrid powertrain system 400 further includes a transmission and a driveline (not shown) to transfer propulsion power to vehicle wheels (not shown) in response to operator inputs. The concepts described herein may apply to any suitable front-wheel drive, rear-wheel drive or all-wheel drive powertrain configuration, with operation controlled by a controller. In this embodiment, the off-axis mechanical drive system 440 is preferably configured as a belt drive, including an outer sheave 452 that is annular to and coupled to a pump 456 of the torque converter 450. Other elements of the off-axis mechanical drive system 440 include a motor pulley 432 that is coupled to a rotor of the electric machine 430 and a continuous belt 442. There is no belt tensioner in this embodiment. The outer sheave 452 and the motor pulley 432 are rotatably coupled via the continuous belt 442 to transfer torque therebetween. The outer sheave 452 and the motor pulley 434 may be suitably configured with belt contact surfaces, and are arranged to have multiple radial teeth in their respective annular surfaces. Some of the radial teeth in the annular surface of the outer sheave 452 are indicated by numeral 453. The continuous belt 442 is preferably configured in accordance with the circumferential grooves in the annular surface of the outer sheave 452 and the motor pulley 434, and thus has a plurality of internal-facing radial teeth. The continuous belt 442 may be fabricated from Kevlar cords in one embodiment. In one embodiment, the pulley ratio between the outer sheave 452 and the motor pulley 434 is 2.5:1. In this embodiment, the belt tension is achieved by tensioner devices (not shown) that are adjusted during assembly or belt installation.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A powertrain system, comprising:
an internal combustion engine including a crankshaft;
an electric machine including a rotatable shaft, wherein the rotatable shaft is coupled to a motor pulley; and
a torque converter, including an impeller and a pump, wherein the pump is coupled to an outer sheave that is disposed on an outer circumference of the pump;
wherein the outer sheave of the torque converter is rotatably coupled to the motor pulley of the electric machine;
wherein the electric machine is coupled to the pump of the torque converter via an off-axis mechanical drive system; and
wherein the crankshaft is coupled to the pump of the torque converter via a clutch.

2. The powertrain system of claim 1, wherein the clutch is a selectable one-way clutch.

3. The powertrain system of claim 1, further comprising a starter rotatably coupled to the crankshaft.

4. The powertrain system of claim 1, further comprising the electric machine electrically connected to an inverter that is electrically connected to an electric power source, wherein the electric power source is configured to operate at a voltage level that is less than 60 V DC.

5. The powertrain system of claim 1, wherein the outer sheave of the torque converter is rotatably coupled to the motor pulley of the electric machine via a continuous belt.

6. A powertrain system, comprising:
an internal combustion engine including a crankshaft;
an electric machine including a rotatable shaft, wherein the rotatable shaft is coupled to a motor pulley;
a torque converter, including an impeller and a pump, wherein the pump is coupled to an outer sheave that is disposed on an outer circumference of the pump; and
a transmission including an input member and an output member, and a driveline;
wherein the outer sheave of the torque converter is rotatably coupled to the motor pulley of the electric machine;
wherein the electric machine is coupled to the pump of the torque converter via an off-axis mechanical drive system; and
wherein the crankshaft is coupled to the pump of the torque converter via a clutch;
wherein the input member of the transmission is coupled to the impeller of the torque converter; and
wherein the output member of the transmission is coupled to the driveline.

7. The powertrain system of claim 6, further comprising a controller operatively connected to the powertrain system, the controller including an instruction set, the instruction set being executable to autostop the internal combustion engine and control operation of the powertrain system in an electric-only drive mode to transfer propulsion power to the driveline.

8. The powertrain system of claim 6, further comprising a controller operatively connected to the powertrain system, the controller including an instruction set, the instruction set being executable to control operation of the powertrain system in an engine/electric-assist drive mode to transfer propulsion power to the driveline.

9. The powertrain system of claim 6, further comprising a controller operatively connected to the powertrain system, the controller including an instruction set, the instruction set being executable to control operation of the powertrain system in a regenerative mode to transfer propulsion power to the driveline.

10. The powertrain system of claim 6, further comprising a controller operatively connected to the powertrain system, the controller including an instruction set, the instruction set being executable to control operation of the powertrain system in an engine-only drive mode to transfer propulsion power to the driveline.

11. The powertrain system of claim 6, wherein the internal combustion engine, transmission and driveline are disposed in a front-wheel drive configuration.

12. The powertrain system of claim 6, wherein the internal combustion engine, transmission and driveline are disposed in a rear-wheel drive configuration.

13. A powertrain system for a vehicle, comprising:
an internal combustion engine including a crankshaft;

an electric machine including a rotatable shaft, wherein the rotatable shaft is coupled to a motor pulley;

a transmission coupled to a driveline, the transmission including an input member and an output member; and a torque converter, including an impeller and a pump, wherein the pump is coupled to an outer sheave;

wherein the outer sheave of the torque converter is rotatably coupled to the motor pulley of the electric machine;

wherein the crankshaft of the internal combustion engine is coupled to the pump of the torque converter via a clutch;

wherein the impeller of the torque converter is coupled to an input member of the transmission;

wherein the input member of the transmission is coupled to the impeller of the torque converter;

wherein the output member of the transmission is coupled to the driveline; and wherein the driveline is disposed in a front-wheel configuration to transfer propulsion power to vehicle wheels.

14. The powertrain system of claim 13, further comprising the electric machine electrically connected to an inverter that is electrically connected to an electric power source, wherein the electric power source is configured to operate at a voltage level that is less than 60 V DC.

15. The powertrain system of claim 13, wherein the outer sheave of the torque converter is rotatably coupled to the motor pulley of the electric machine via a continuous belt.

16. The powertrain system of claim 13, wherein the outer sheave of the torque converter is rotatably coupled to the motor pulley of the electric machine via a chain.

17. The powertrain system of claim 13, wherein the outer sheave of the torque converter is rotatably coupled to the motor pulley of the electric machine via a gear train.

18. A powertrain system, comprising:

an electric machine including a rotatable shaft, wherein the rotatable shaft is coupled to a motor pulley;

a torque converter, including an impeller and a pump, wherein the pump is coupled to an outer sheave that is disposed on an outer circumference of the pump;

wherein the outer sheave of the torque converter is rotatably coupled to the motor pulley of the electric machine; and wherein the electric machine is rotatably coupled to the pump of the torque converter via an off-axis mechanical drive system.

* * * * *